United States Patent
Iwahara et al.

(10) Patent No.: US 10,233,370 B2
(45) Date of Patent: Mar. 19, 2019

(54) MOLDED BODY AND METHOD FOR PRODUCING SAME

(71) Applicant: NICHIAS CORPORATION, Tokyo (JP)

(72) Inventors: Kengo Iwahara, Tokyo (JP); Mitsuru Fujimoto, Tokyo (JP); Katsutoyo Itoi, Tokyo (JP); Michio Machii, Tokyo (JP); Masaki Yokoya, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 4 days.

(21) Appl. No.: 15/300,435

(22) PCT Filed: Mar. 31, 2015

(86) PCT No.: PCT/JP2015/001862
§ 371 (c)(1),
(2) Date: Sep. 29, 2016

(87) PCT Pub. No.: WO2015/151515
PCT Pub. Date: Oct. 8, 2015

(65) Prior Publication Data
US 2017/0114258 A1    Apr. 27, 2017

(30) Foreign Application Priority Data
Mar. 31, 2014  (JP) .................. 2014-070778

(51) Int. Cl.
*C08L 27/18*    (2006.01)
*C09K 3/10*    (2006.01)
(Continued)

(52) U.S. Cl.
CPC .......... *C09K 3/1009* (2013.01); *B29C 43/003* (2013.01); *B29C 43/006* (2013.01);
(Continued)

(58) Field of Classification Search
CPC ............ C08L 27/18; C08L 27/12; C08K 5/18
See application file for complete search history.

(56) References Cited

U.S. PATENT DOCUMENTS 4,248,763 A * 2/1981 Yoshimura ............... C08K 3/04
524/180
4,758,627 A * 7/1988 Wilkus ..................... C08L 7/00
525/193
(Continued)

FOREIGN PATENT DOCUMENTS

EP    0 970 799 A1    1/2000
EP    1 188 808 A1    3/2002
(Continued)

OTHER PUBLICATIONS

Partial supplementary European Search Report issued in corresponding application 15 772 950.0 dated Oct. 25, 2017.
(Continued)

*Primary Examiner* — Rip A Lee
(74) *Attorney, Agent, or Firm* — Griffin and Szipl PC

(57) ABSTRACT

A formed body including: a polytetrafluoroethylene or a modified polytetrafluoroethylene; and an unmodified polymerization inhibitor, the content of the unmodified polymerization inhibitor being 0.02 to 15 wt %.

18 Claims, 1 Drawing Sheet

(51) Int. Cl.
  *C08J 5/18* (2006.01)
  *C08K 5/18* (2006.01)
  *F16J 15/10* (2006.01)
  *B29C 43/00* (2006.01)
  *C08K 3/22* (2006.01)
  *B29K 27/18* (2006.01)
  *B29K 105/00* (2006.01)
  *B29L 31/26* (2006.01)

(52) U.S. Cl.
  CPC .............. *C08J 5/18* (2013.01); *C08K 3/22* (2013.01); *C08K 5/18* (2013.01); *F16J 15/102* (2013.01); *F16J 15/108* (2013.01); *B29K 2027/18* (2013.01); *B29K 2105/251* (2013.01); *B29L 2031/265* (2013.01); *C08J 2327/18* (2013.01); *C08K 2003/2227* (2013.01); *C08K 2003/2241* (2013.01); *C08K 2201/019* (2013.01); *C09K 2003/1096* (2013.01); *C09K 2200/0239* (2013.01); *C09K 2200/0458* (2013.01); *C09K 2200/0637* (2013.01)

(56) References Cited

U.S. PATENT DOCUMENTS

| | | | | |
|---|---|---|---|---|
| 5,646,192 A | * | 7/1997 | Dolan | B29B 9/02 521/56 |
| 5,658,960 A | | 8/1997 | Dolan | |
| 5,683,639 A | * | 11/1997 | Ebnesajjad | B29C 35/16 264/127 |
| 5,712,315 A | | 1/1998 | Dolan | |
| 6,287,497 B1 | * | 9/2001 | Kawachi | B29C 43/006 264/127 |
| 6,734,236 B1 | * | 5/2004 | Tomihashi | B01J 19/02 428/424.6 |
| 6,838,502 B1 | * | 1/2005 | Nodera | C08L 69/00 523/201 |
| 2003/0062644 A1 | * | 4/2003 | Oyama | B29C 43/003 264/41 |
| 2005/0250909 A1 | | 11/2005 | Hammar et al. | |
| 2010/0084782 A1 | | 4/2010 | Hammar et al. | |
| 2011/0097593 A1 | * | 4/2011 | Yoshikawa | F16O 33/201 428/550 |
| 2015/0202827 A1 | * | 7/2015 | Sadana | B29C 67/202 264/49 |

FOREIGN PATENT DOCUMENTS

| | | | | |
|---|---|---|---|---|
| GB | 1155270 | * | 6/1969 | ............. B29F 5/00 |
| JP | 55-016057 A | | 2/1980 | |
| JP | 55-133442 A | | 10/1980 | |
| JP | 08-506850 A | | 7/1996 | |
| JP | 11-71574 A | * | 3/1999 | ............. C09K 3/10 |
| JP | 11-071574 A | | 3/1999 | |
| JP | 2008-260191 A | | 10/2008 | |
| JP | 2010-111725 A | | 5/2010 | |
| JP | 2010-138404 A | | 6/2010 | |
| JP | 2012-237450 A | | 12/2012 | |
| WO | 2013/146104 A | | 10/2013 | |

OTHER PUBLICATIONS

Written Opinion of the International Searching Authority issued in corresponding application PCT/JP2015/001862, dated Jun. 30, 2015.
International Search Report issued in corresponding application PCT/JP2015/001862, completed Jun. 18, 2015 and dated Jun. 30, 2015.

* cited by examiner

MOLDED BODY AND METHOD FOR PRODUCING SAME

This is a National Phase Application in the United States of International Patent Application No. PCT/JP2015/001862 filed Mar. 31, 2015, which claims priority on Japanese Patent Application No. 2014-070778, filed Mar. 31, 2014. The entire disclosures of the above patent applications are hereby incorporated by reference.

TECHNICAL FIELD

The invention relates to a formed body and a production method thereof.

BACKGROUND ART

Gaskets are used as a joint for pipes in various plants of petrochemistry, petroleum processing, electric power and paper manufacturing, for example. Gaskets fill spaces and at the same time prevent leakage of fluids or incorporation of extraneous materials from the outside.

When a gasket is used in a plant for producing a monomer such as butadiene, styrene and acrylonitrile, a monomer produced penetrates the gasket and polymerizes whereby the gasket swells to clog a pipe (so-called flower phenomenon) or the gasket itself is broken due to swelling. In addition, for a gasket with a large opening, the gasket is corroded by monomer polymerization inside the gasket, thereby leading to monomer leakage. The swelled gasket peels to contaminate a product.

Patent Document 1 discloses a sealing material that can have a low swelling ratio relative to a gaseous monomer. However, the sealing material does not have a sufficient swelling resistance and the production of large size products using the sealing material is difficult due to the poor mold-releasing property and productivity thereof. Although there are various descriptions in Patent Document 1, the only practically-available sealing material is one obtained by adding an amine compound as a polymerization inhibitor to tetrafluoroethylene-perfluoro(alkylvinyether) copolymer (PFA). Current products are high at cost and blackish. The market requires whitish products.

RELATED ART DOCUMENTS

Patent Documents

Patent Document 1: JP-A-2010-138404

SUMMARY OF THE INVENTION

An object of the invention is to provide a formed body having an excellent swelling resistance.

PFA has been known as a most excellent sealing material conventionally. The inventors have conducted diligent research to obtain a sealing material that is similar or superior to PFA instead of PFA by using PTFE which PFA is low at production cost and cost of its raw material. In the research, the inventors have found that when formed bodies such as a gasket are produced from a fluorine resin and a swelling inhibitor, the structure of an amine compound added as a swelling inhibitor changes by heating in the presence of oxygen during forming, so that most of the amine compound does not remain in a final product and swelling is not sufficiently inhibited. The inventors have also found that the modified amine compound blackens the product. Further the inventors have found that a sulfur-containing compound contained in conventional products reduces the mold-releasing property of formed bodies and causes a corrosion-resistant plating of a mold to be peeled. Based on these findings, the inventors made the invention.

According to the invention, the following formed body is provided.

1. A formed body comprising:
    a polytetrafluoroethylene or a modified polytetrafluoroethylene; and
    an unmodified polymerization inhibitor, the content of the unmodified polymerization inhibitor being 0.02 to 15 wt %.
2. The formed body according to 1, wherein the content of the unmodified polymerization inhibitor is 0.3 to 15 wt %.
3. The formed body according to 1 or 2, wherein the unmodified polymerization inhibitor is di-β-naphthyl-p-phenylene diamine.
4. The formed body according to any one of 1 to 3, wherein the formed body does not comprise a sulfur-containing compound.
5. The formed body according to any one of 1 to 4, wherein the content of the unmodified polymerization inhibitor is 0.5 to 8 wt %.
6. The formed body according to any one of 1 to 5, wherein the formed body has a whiteness degree of 15 or more and a yellowness degree of 65 or less.
7. The formed body according to any one of 1 to 6, wherein the formed body further comprises one or more selected from the group consisting of alumina, titanium oxide, silica, barium sulfate, silicon carbide, silicon nitride, glass fiber, glass beads and mica.
8. The formed body according to any one of 1 to 7, wherein the formed body is a gasket.
9. The formed body according to any one of 1 to 8, wherein the formed body is a monomer-resistant gasket.
10. A method for producing the formed body according to any one of 1 to 9, the method comprising the steps of:
    filling a mold with a raw material comprising 80 to 99.95 wt % of a polytetrafluoroethylene or a modified polytetrafluoroethylene and 0.05 to 20 wt % of a polymerization inhibitor, and subjecting the raw material to compression molding under a surface pressure of 20 to 60 MPa to form a compression-molded body; and
    firing the compression-molded body at 350 to 370° C.
11. The method according to 10, wherein the raw material comprises 80 to 99.5 wt % of the polytetrafluoroethylene or the modified polytetrafluoroethylene and 0.5 to 20 wt % of the polymerization inhibitor.
12. The method according to 10 or 11, wherein the compression-molded body is a cylinder; and
    the method further comprises the steps of cutting an outer longitudinal surface of a fired cylinder that is the fired compression-molded body to obtain a sheet; and punching a ring from the sheet.
13. The method according to 12, wherein the fired cylinder has a diameter of 150 to 500 mm.
14. The method according to 12 or 13, wherein at least 3 mm-thick parts are removed from outer surface, inner surface and edge surfaces of the fired cylinder, and thereafter the step of obtaining the sheet by cutting is conducted.
15. The method according to any one of 10 to 14, wherein in the firing step, the compression-molded body is covered with an oxygen-shielding plate and fired.
16. The method according to any one of 10 to 14, wherein in the firing step, the compression-molded body is fired in an oxygen-reduced atmosphere or an oxygen-free atmosphere.

According to the invention, it is possible to provide a formed body having an excellent swelling resistance.

MODE FOR CARRYING OUT THE INVENTION

[Formed Body]

Figure 1:
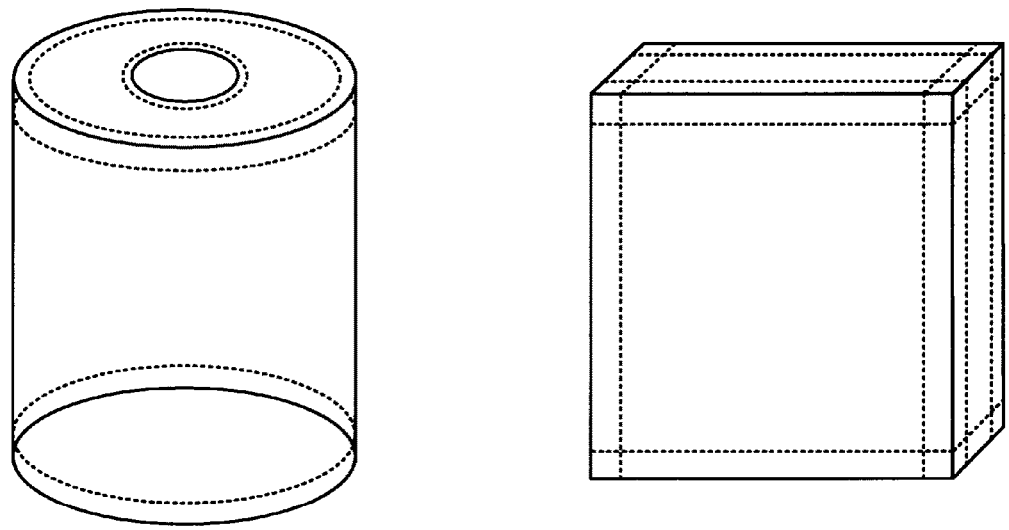
FIG. 1 is a view showing parts to be subjected to skiving when a compression-molded body is a cylinder or a rectangular parallelepiped.

The formed body of the invention comprises a polytetrafluoroethylene or a modified polytetrafluoroethylene; and an unmodified polymerization inhibitor, and the content of the unmodified polymerization inhibitor is 0.02 to 15 wt %.

The formed body includes a gasket, a packing, a lining and a container.

Since the formed body of the invention contains an unmodified polymerization inhibitor, even if the formed body is used as a gasket in a monomer-producing plant, it can be suppressed that a monomer produced penetrates into the gasket and polymerizes in the gasket and as a result, the gasket swells to clog a pipe (flower phenomenon) or the gasket itself is broken.

The gasket of the invention has a long service life as a gasket. Thus, the exchange frequency of gasket can be reduced and the plant utilization can be enhanced.

[Polytetrafluoroethylene or Modified Polytetrafluoroethylene]

Polytetrafluoroethylene (PTFE) is a homopolymer of tetrafluoroethylene. The modified polytetrafluoroethylene (modified PTFE) is a polytetrafluoroethylene that is modified by a perfluoroalkylvinylether.

As an example of the above perfluoroalkylvinylether, the perfluoroalkylvinylether shown by the following formula (1) can be given.

$$CF_2=CF-OR_f \quad (1)$$

wherein in formula (1), $R_f$ is a perfluoroalkyl group having 1 to 10, preferably 1 to 5, carbon atoms, or a perfluoroorganic group shown in the following formula (2).

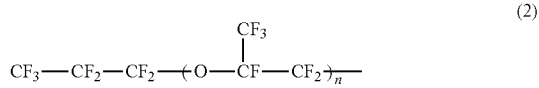

$$CF_3-CF_2-CF_2-(O-\underset{\underset{CF_3}{|}}{CF}-CF_2)_n- \quad (2)$$

wherein in formula (2), n is an integer of 1 to 4.

The perfluoroalkyl group having 1 to 10 carbon atoms of formula (1) includes a perfluoromethyl group, perfluoroethyl group, perfluoropropyl group, perfluorobutyl group, perfluoropentyl group and perfluorohexyl group, with a perfluoropropyl group being preferable.

The content of polytetrafluoroethylene or modified polytetrafluoroethylene in the formed body of the invention is, for example, 85 to 99.98 wt %, preferably 85 to 99.7 wt %, more preferably 90 to 99.5 wt %, more preferably 92 to 99.5 wt %, and even more preferably 95 to 99.3 wt %.

[Polymerization Inhibitor]

The polymerization inhibitor which the formed body of the invention contains is an unmodified polymerization inhibitor.

The content of polymerization inhibitor contained in the formed body is not always the same as the content of polymerization inhibitor added for producing the formed body for the following reasons. For example, when a formed body is produced by melt forming, a polymerization inhibitor in a raw material is modified and changed in structure by heat and oxygen during the forming, whereby the polymerization inhibitor hardly remains in a formed body.

If the polymerization inhibitor is N,N'-di-naphthyl-p-phenylenediamine, the structure thereof is modified and changed after melt forming as follows.

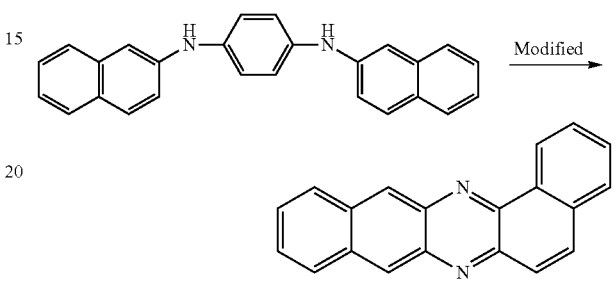

As a polymerization inhibitor which the formed body of the invention contains, amine polymerization inhibitors and/or phenol polymerization inhibitors can be given.

Amine polymerization inhibitors include N,N'-di-naphthyl-p-phenylenediamine, poly(2,2,4-trimethyl-1,2-dihydroquinoline), di(4-octylphenyl)amine, 4,4'-bis(α,α-dimethylbenzyl)diphenylamine, and N-(1,3-dimethylbutyl)-N'-phenyl-1,4-phenylenediamine. The structures thereof are shown below.

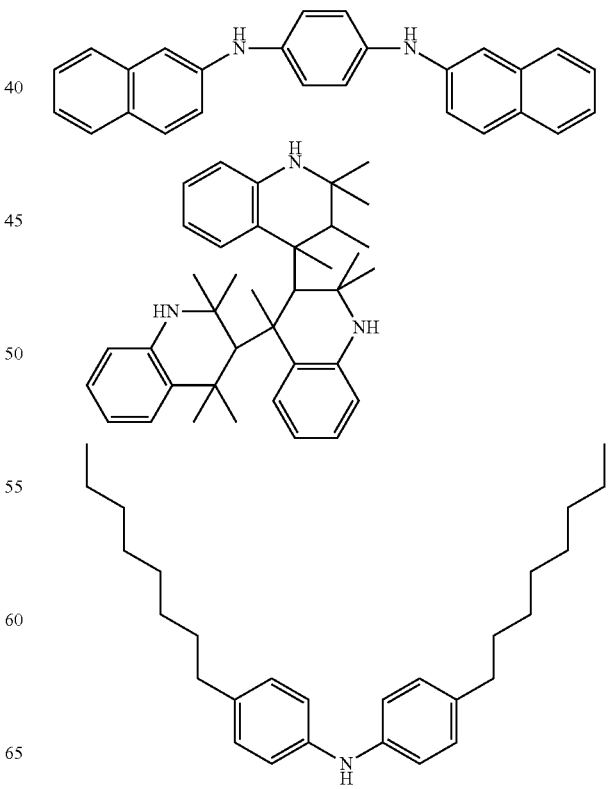

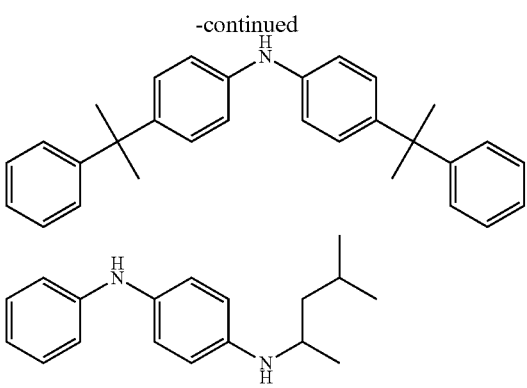

As an amine polymerization inhibitor, in addition to the above, aromatic secondary diamine compounds can be used which include N-phenyl-1-naphthylamine, octyl-substituted diphenyl amine, 4,4'-bis(α,α-dimethylbenzyl)diphenylamine, p-(p-toluenesulfonylamide)diphenylamine, N,N'-diphenyl-p-phenylenediamine, N-phenyl-N'-isopropyl-p-phenylenediamine, N-phenyl-N'-(1,3-dimethylbutyl)-p-phenylenediamine and N-phenyl-N'-(3-methacryloyloxy-2-hydroxypropyl)-p-phenylenediamine. Further Nocrac ODA and Nocrac ODA-N manufactured by Ouchi Shinko Chemical Industrial can be also used.

As a phenol polymerization inhibitor, compounds having the following structures can be given.

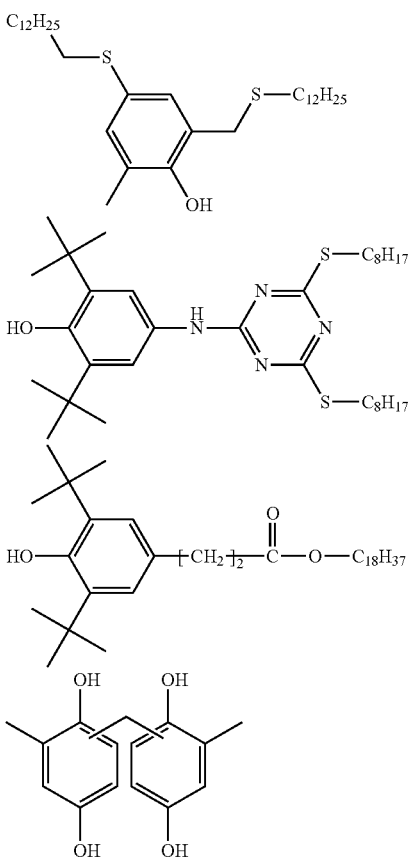

The polymerization inhibitor may be one or more selected from the group of the above amine polymerization inhibitors and phenol polymerization inhibitors, with N,N'-di-naphthyl-p-phenylenediamine being preferable.

The content of unmodified polymerization inhibitor in the formed body of the invention is 0.02 to 15 wt %, preferably 0.03 to 15 wt %, more preferably 0.3 to 15 wt %, more preferably 0.5 to 10 wt %, further preferably 0.5 to 8 wt %, even further preferably 0.7 to 5.0 wt %. The content of unmodified polymerization inhibitor in the formed body may be 3.0 to 8.0 wt %.

The content of unmodified polymerization inhibitor in the formed body can be confirmed by gas chromatograph mass spectrometry (GC/MS analysis).

[Other Fillers]

The formed body of the invention may further contain a filler. The filler includes alumina, titanium oxide, silica, barium sulfate, silicon carbide, silicon nitride, glass fiber, glass beads and mica. One, or two or more thereof can be used.

Among the above fillers, alumina and/or titanium oxide are preferred. Alumina and titanium oxide not only improve the whiteness degree of a formed body but also improve the thermal resistance of a formed body and suppress polymerization.

The content of one or more fillers selected from alumina, titanium oxide, silica, barium sulfate, silicon carbide, silicon nitride, glass fiber, glass beads and mica in the formed body of the invention is 0.5 to 50 wt %, for example, and preferably 1 to 35 wt %.

The formed body of the invention may consist essentially of or consist of a polytetrafluoroethylene or a modified polytetrafluoroethylene; an unmodified polymerization inhibitor; and optionally one or more fillers selected from the group consisting of alumina, titanium oxide, glass fiber, glass beads and mica.

The formed body of the invention does not preferably contain a sulfur-containing compound.

Sulfur-containing compounds such as benzimidazole based mercaptan compounds, benzothiazole based mercaptan compounds and thiuram compounds are known as a polymerization inhibitor. When using such a sulfur-containing compound for producing a formed body, a sulfur gas may be generated from the sulfur-containing compound during firing. The sulfur gas is a corrosive gas and may damage a mold when using a mold for forming and may degrade the forming due to occurrence of air bubbles in a formed body.

The formed body preferably has a whiteness degree of 15 or more and a yellowness degree of 65 or less. This color degree enables easy finding of dirts adhered to a formed body, hides parts lacked by abrasion and the like, and gives a clean impression to users.

The whiteness degree and yellowness degree can be evaluated by using a color meter. The whiteness degree can be measured according to JISP8123 and ASTMD985-50, and the yellowness degree can be measured according to JISK7103.

[Production Method of Formed Body]

The method for producing the formed body of the invention comprises the following steps (1) and (2).

(1) Step of filling a mold with a raw material comprising 80 to 99.95 wt % of a polytetrafluoroethylene or a modified polytetrafluoroethylene and 0.05 to 20 wt % of a polymerization inhibitor, and subjecting the raw material to compression molding under a surface pressure of 20 to 60 MPa to form a compression-molded body (2) Step of firing the compression-molded body at 350 to 370° C.

A polymerization inhibitor catches radicals generated in a reaction system and the polymerization inhibitor itself polymerizes to become dimers or cycles, thereby suppress polymerization Thus, when a formed body is produced by melt forming, a polymerization inhibitor is exposed to oxygen and heat during forming and almost loses its radical-catching function due to the oxygen radicals and heat. In a formed body produced by melt forming, a part of polymerization inhibitor contained in the formed body changes in structure and loses the radical-catching function.

According to the method of producing a formed body of the invention, a raw material containing a polytetrafluoroethylene (PTFE) or a modified polytetrafluoroethylene (modified PTFE), and a polymerization inhibitor is subjected to compression molding. The compression molding removes oxygen contained in the formed body. As a result, even if the formed body is fired later, the polymerization inhibitor does not lose the radical-catching function.

Further, melt forming is disadvantageous in cost since it requires a large-scale apparatus and is difficult to produce a large size formed bodies by restrictions of the apparatus. In contrast, compression molding used in the invention has no restrictions unlike melt forming and enables production of large size formed bodies at low cost.

For example, when formed bodies are produced by using a tetrafluoroethylene-perfluoro(alkylvinyether) copolymer (PFA), melt forming is needed, since PFA is not suitable for compression molding using a mold due to its small molecular weight, low melt viscosity and high fluidity.

The raw material for compression molding contains 80 to 99.95 wt % of a polytetrafluoroethylene or a modified polytetrafluoroethylene and 0.05 to 20 wt % of a polymerization inhibitor, or for example, 80 to 99.5 wt % of a polytetrafluoroethylene or a modified polytetrafluoroethylene and 0.5 to 20 wt % of a polymerization inhibitor.

When the raw material for compression molding contains one or more fillers selected from alumina, titanium oxide, glass fiber, glass beads and mica, the content of the fillers is 1 to 50 wt % based on the total of a polytetrafluoroethylene or a modified polytetrafluoroethylene, and a polymerization inhibitor, for example.

A mold is filled with the raw material, and the filled raw material is subjected to compression molding under a surface pressure of 20 to 60 MPa to form a compression-molded body. A preferred surface pressure is preferably 30 to 50 MPa.

FIG. 1 shows compression-molded bodies of a cylinder and a rectangular parallelepiped. Parts shown by dotted lines may be subjected to skiving or cutting.

The compression-molded body obtained is fired at 350 to 370° C., preferably 360 to 370° C.

When fired, the compression-molded body is preferably covered with an oxygen-shielding plate and/or is preferably fired in an oxygen-reduced atmosphere or an oxygen-free atmosphere, which can suppress the lose of radical-catching function of a polymerization inhibitor.

The above firing in an oxygen-reduced atmosphere includes firing with nitrogen introduction. The above firing in an oxygen-free atmosphere includes firing in a nitrogen atmosphere.

When a formed body to be produced is a gasket, the shape of a compression-molded body is preferably a cylinder. If a compression-molded body is a cylinder, the diameter thereof is preferably 100 to 500 mm, more preferably 150 to 500 mm.

When a compression-molded body is a cylinder, the method of producing a gasket of the invention further comprises the following steps (3) and (4).

(3) Step of Cutting an Outer Longitudinal Surface of the Fired Cylinder to Obtain a Sheet (4) Step of Punching a Ring from the Sheet Before conducting the step of cutting an outer longitudinal surface of the fired cylinder to obtain a sheet, parts of from outer surface, inner surface and edge surfaces of the fired cylinder to a depth of at least 3 mm from these surfaces may be removed (parts shown in dotted lines in FIG. 1). Because a polymerization inhibitor present in the outer surface and inner surface of cylinder may have a reduced radical-catching function.

Figure 2:
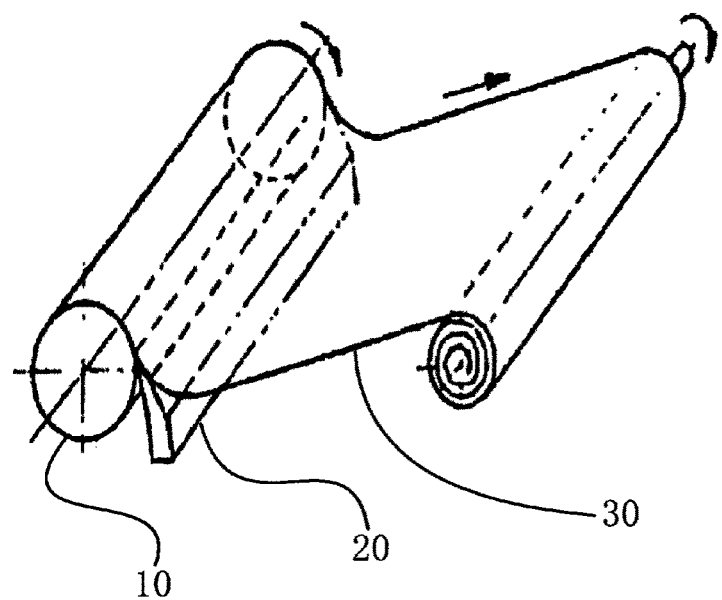
FIG. 2 is a view showing the step of cutting the outer longitudinal surface of fired cylinder to obtain a sheet.

The step of cutting an outer longitudinal surface of the fired cylinder to obtain a sheet can be conducted by using a device shown in FIG. 2. The sheet obtained by cutting preferably has a thickness of 1 to 3 mm.

In FIG. 2, a bite 20 cuts a rotating fired cylinder 10 to a sheet 30.

A gasket of the invention can be obtained by punching a ring from the sheet.

According to the method of the invention, a gasket with a large caliber of 1 m, for example, can be produced. If the gasket has a large caliber, the phenomenon that a monomer enters a gasket and polymerizes therein to clog a pipe (flower phenomenon) can be suppressed.

EXAMPLES

Example 1

Polytetrafluoroethylene and di-β-naphthyl-p-phenylenediamine (DNPD) were mixed in a henschel mixer to obtain a mixed powder of which the content of di-β-naphthyl-p-phenylenediamine was 1.5 wt %. The mixed powder was filled into a mold and subjected to compression molding by applying a press pressure of 40 MPa from the top and bottom for 0.5 hour to obtain a cylindrical preliminary molded body (outer diameter 100 mm×height 20 mm).

The preliminary molded body thus obtained was placed in a firing furnace and fired at 365° C. for 5 hours. The cylindrical fired body (outer diameter 100 mm×height 20 mm) was subjected to turning process to obtain a sheet with a thickness of 1.5 mm. The sheet for gaskets was evaluated as follows. Table 1 shows the results.

Before the turning process, 3 mm-thick parts were cut off from the outer surfaces of cylindrical fired body. Gaskets can be obtained by punching rings from the sheet.

[Weight Change Ratio Before and after Immersion]

An ASTM micro type dumbbell sample was punched from the sheet obtained to prepare an immersion sample. The immersion sample was attached onto a ceiling part of a 2 L pressure tight container and a butadiene monomer liquid that did not contain a polymerization inhibitor was poured into the pressure tight container such that the liquid did not become in contact with the immersion sample.

The container was allowed to strand for 11 days maintaining the inside of the container to be at 70° C. under 0.8 MPa, and then the sample was taken out and dried. The weight of sample dried after the immersion was measured to calculate an increased weight that is a difference from the weight of the sample before the immersion test. The increased weight was derived from solid matters generated by polymerization of a butadiene monomer gas in the sample.

[Color Degree]

For the sheet obtained, by using a white color meter, the whiteness degree was evaluated according to JISP8123 and ASTMD985-50, and the yellowness degree was evaluated according to JISK7103.

[Residual Ratio of di-β-naphthyl-p-phenylenediamine]

A piece of about 6 mg was cut from the sheet obtained as a sample for measurement. The sample was measured by using pyrolysis GC-MS under the following conditions. The residual ratio of di-β-naphthyl-p-phenylenediamine in the sheet was evaluated based on the positions and areas of peaks in spectrum.

Measurement Conditions:
Pyrolytic temperature and time; 445° C.×5 seconds
GC column; Ultra alloy-1
Temperature-raising conditions; 50° C. to 300° C. at a raising rate of 20° C./min

[Mold-Releasing Property]

When a resin stuck to a mold after compression molding and a next molding required grinding of the mold, a mold-releasing property was evaluated as "bad". When a resin could be removed from a mold with hands, a mold-releasing property was evaluated as "good".

Example 2

A sheet for gaskets was produced and evaluated in the same manner as in Example 1 except that the content of di-β-naphthyl-p-phenylenediamine in a mixed powder used for production of a preliminary molded body was changed to 5.0 wt %. Table 1 shows the results.

Example 3

A sheet for gaskets was produced and evaluated in the same manner as in Example 1 except that 1.5 wt % of alumina based on the total of polytetrafluoroethylene and polymerization inhibitor was added to a mixed powder used for production of a preliminary molded body. Table 1 shows the results.

Example 4

A sheet for gaskets was produced and evaluated in the same manner as in Example 1 except that 1.5 wt % of titanium oxide based on the total of polytetrafluoroethylene and polymerization inhibitor was added to a mixed powder used for production of a preliminary molded body. Table 1 shows the results.

Examples 5 to 11

Sheets for gaskets were produced and evaluated in the same manner as in Example 1 except that the content of di-β-naphthyl-p-phenylenediamine in a mixed powder used for production of a preliminary molded body and molding conditions of a preliminary molded body were changed as shown in Table 1. Table 1 shows the results.

Comparative Example 1

Tetrafluoroethylene-perfluoroalkylvinylether copolymer, di-β-naphthyl-p-phenylenediamine and 2-mercaptobenzothiazole (MBT) were mixed and sufficiently kneaded such that the contents of di-β-naphthyl-p-phenylenediamine and 2-mercaptobenzothiazole each were 1.5 wt %. After kneading, the mixture was subjected to melt molding at 360° C. by using a heat press to produce a sheet with a thickness of 1.5 mm.

The sheet was evaluated in the same manner as in Example 1. Table 1 shows the results.

The sheet contained not only di-β-naphthyl-p-phenylenediamine but also 2-mercaptobenzothiazole. The residual ratio of 2-mercaptobenzothiazole was evaluated in the same manner as that of di-β-naphthyl-p-phenylenediamine. As a result, the residual ratio of 2-mercaptobenzothiazole was less than 0.02 wt % that was the measurement limit.

Comparative Example 2

A sheet for gaskets was produced and evaluated in the same manner as in Example 1 except that the press pressure of compression molding of a mixed powder was 15 MPa and the firing temperature of a preliminary molded body was 375° C. Table 1 shows the results. The residual ratio of DNPD was less than 0.02 wt % that was the measurement limit.

Comparative Example 3

A sheet for gaskets was produced and evaluated in the same manner as in Example 1 except that di-β-naphthyl-p-phenylenediamine was not used in a mixed powder used for production of a preliminary molded body and molding conditions of a preliminary molded body were changed as shown in Table 1. Table 1 shows the results.

TABLE 1

| | Base Material | Polymerization Inhibitor | | Filler | Molding Method and Conditions | Thickness of Fired Body | Weight Change Ratio before and after Immersion | Color Degree | | DNPD Resudial Ratio | Mold-releasing Property |
|---|---|---|---|---|---|---|---|---|---|---|---|
| | | DNPD | MBT | | | | | YI | WB | | |
| Example 1 | PTFE | 1.5 wt % | — | — | Compression Molding 365° C. 40 MPa | 20 mm | 0.1 wt % | 59 | 23 | 1.0 wt % | Good |
| Example 2 | PTFE | 5.0 wt % | — | — | Compression Molding 365° C. 40 MPa | 20 mm | 0.03 wt % | 60 | 22 | 4.3 wt % | Good |
| Example 3 | PTFE | 1.5 wt % | — | Alumina 1.5 wt % | Compression Molding 365° C. 40 MPa | 20 mm | 0.11 wt % | 57 | 25 | 1.0 wt % | Good |

TABLE 1-continued

| | Base Material | Polymerization Inhibitor | | Filler | Molding Method and Conditions | Thickness of Fired Body | Weight Change Ratio before and after Immersion | Color Degree | | DNPD Resudial Ratio | Mold-releasing Property |
|---|---|---|---|---|---|---|---|---|---|---|---|
| | | DNPD | MBT | | | | | YI | WB | | |
| Example 4 | PTFE | 1.5 wt % | — | Tutanium Oxide 1.5 wt % | Compression Molding 365° C. 40 MPa | 20 mm | 0.11 wt % | 57 | 26 | 0.9 wt % | Good |
| Example 5 | PTFE | 0.1 wt % | — | — | Compression Molding 365° C. 30 MPa | 20 mm | 0.1 wt % | 37 | 35 | 0.02 wt % | Good |
| Example 6 | PTFE | 0.3 wt % | — | — | Compression Molding 365° C. 30 MPa | 20 mm | 0.1 wt % | 47 | 34 | 0.03 wt % | Good |
| Example 7 | PTFE | 0.5 wt % | — | — | Compression Molding 365° C. 30 MPa | 20 mm | 0.1 wt % | 48 | 34 | 0.06 wt % | Good |
| Example 8 | PTFE | 1.0 wt % | — | — | Compression Molding 365° C. 30 MPa | 20 mm | 0.1 wt % | 49 | 34 | 0.4 wt % | Good |
| Example 9 | PTFE | 1.5 wt % | — | — | Compression Molding 365° C. 30 MPa | 20 mm | 0.1 wt % | 50 | 32 | 0.6 wt % | Good |
| Exarrple 10 | PTFE | 5.0 wt % | — | — | Compression Molding 365° C. 30 MPa | 20 mm | 0.1 wt % | 51 | 31 | 3.25 wt % | Good |
| Exarrple 11 | PTFE | 10.0 wt % | — | — | Compression Molding 365° C. 30 MPa | 20 mm | 0.1 wt % | 53 | 28 | 7.9 wt % | Good |
| Com. Exam. 1 | PFA | 1.5 wt % | 1.5 wt % | — | Melt Compression Molding 360° C. | 1.5 mm | 1.0 wt % | 79 | 6 | Less than Measurement Limit | Bad |
| Com. Exam. 2 | PTFE | 1.5 wt % | — | — | Compression Molding 375° C. 15 Mpa | 20 mm | 0.6 wt % | 77 | 7 | Less than Measurement Limit | Good |
| Com. Exam. 3 | PTFE | 0 wt % | — | — | Compression Molding 365° C. 30 MPa | 20 mm | 6.0 wt % | −30 | 67 | — | Good |

INDUSTRIAL APPLICABILITY

The formed body of the invention can be suitably used as a monomer-resistant gasket used in pipe joints of a petrochemistry plant for producing permeable monomers, for example.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the description and the specification of the Japanese application on the basis of which the present application claims Paris Convention priority are incorporated herein by reference in its entirety.

The invention claimed is:

1. A formed body comprising:
   85 to 99.98 wt % based on the total weight of the body of a polytetrafluoroethylene or a modified polytetrafluoroethylene, the polytetrafluoroethylene being a homopolymer of tetrafluoroethylene, the modified polytetrafluoroethylene being a polytetrafluoroethylene that is modified by a perfluoroalkylvinylether; and
   0.02 to 15 wt % based on the total weight of the body of an unmodified polymerization inhibitor;
   wherein the formed body does not comprise a sulfur-containing compound.

2. The formed body according to claim 1, wherein the content of the unmodified polymerization inhibitor is 0.3 to 15 wt % based on the total weight of the body.

3. The formed body according to claim 1, wherein the content of the unmodified polymerization inhibitor is 0.5 to 8 wt % based on the total weight of the body.

4. The formed body according to claim 1, wherein the unmodified polymerization inhibitor is an amine polymerization inhibitor.

5. The formed body according to claim 1, wherein the unmodified polymerization inhibitor is di-β-naphthyl-p-phenylene diamine.

6. The formed body according to claim 1, wherein the formed body has a whiteness degree of 15 or more.

7. The formed body according to claim 1, wherein the formed body has a whiteness degree of 15 or more and a yellowness degree of 65 or less.

8. The formed body according to claim 1, wherein the formed body further comprises one or more selected from the group consisting of alumina, titanium oxide, silica, barium sulfate, silicon carbide, silicon nitride, glass fiber, glass beads and mica.

9. The formed body according to claim 1, wherein the formed body is a gasket.

10. The formed body according to claim 1, wherein the formed body is a monomer-resistant gasket.

11. A method for producing the formed body according to claim 1, the method comprising the steps of:

filling a mold with a raw material comprising 80 to 99.95 wt % based on the total weight of the raw material of a polytetrafluoroethylene or a modified polytetrafluoroethylene and 0.05 to 20 wt % based on the total weight of the raw material of a polymerization inhibitor, and subjecting the raw material to compression molding under a surface pressure of 20 to 60 MPa to form a compression-molded body; and firing the compression-molded body at 350 to 370° C.

12. The method according to claim 11, wherein the raw material comprises 80 to 99.5 wt % based on the total weight of the raw material of the polytetrafluoroethylene or the modified polytetrafluoroethylene and 0.5 to 20 wt % based on the total weight of the raw material of the polymerization inhibitor.

13. The method according to claim 11, wherein the compression-molded body is a cylinder; and the method further comprises cutting an outer longitudinal surface of a fired cylinder that is the fired compression-molded body to obtain a sheet; and punching a ring from the sheet.

14. The method according to claim 13, wherein the fired cylinder has a diameter of 150 to 500 mm.

15. The method according to claim 13, further comprising removing at least 3 mm-thick parts from outer surface, inner surface and edge surfaces of the fired cylinder, and, thereafter, cutting to obtain a sheet.

16. The method according to claim 11, wherein in the firing step, the method further comprises covering the compression-molded body with an oxygen-shielding plate before firing.

17. The method according to claim 11, wherein the compression-molded body is fired in an oxygen-reduced atmosphere or an oxygen-free atmosphere.

18. The method according to claim 11, wherein the surface pressure is 30 to 50 MPa.

* * * * *